(12) United States Patent
Watakabe

(10) Patent No.: US 8,227,139 B2
(45) Date of Patent: Jul. 24, 2012

(54) POLYMER ELECTROLYTE FUEL CELL, ELECTROLYTE MATERIAL THEREFORE AND METHOD FOR ITS PRODUCTION

(75) Inventor: Atsushi Watakabe, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 226 days.

(21) Appl. No.: 12/535,709

(22) Filed: Aug. 5, 2009

(65) Prior Publication Data
US 2009/0288290 A1 Nov. 26, 2009

Related U.S. Application Data

(62) Division of application No. 10/640,022, filed on Aug. 14, 2003, now abandoned.

(51) Int. Cl.
C08F 214/26 (2006.01)
C08F 259/08 (2006.01)
C08F 14/26 (2006.01)
H01M 8/10 (2006.01)

(52) U.S. Cl. ........ 429/494; 525/200; 525/276; 525/255; 429/409

(58) Field of Classification Search .................. 525/276, 525/200, 32; 526/247, 255; 429/409, 493, 429/494
See application file for complete search history.

(56) References Cited

U.S. PATENT DOCUMENTS

| | | | |
|---|---|---|---|
| 4,273,729 A | 6/1981 | Krespan | |
| 6,274,677 B1 | 8/2001 | Tatemoto | |
| 6,610,789 B2 | 8/2003 | Watakabe et al. | |
| 7,220,508 B2 | 5/2007 | Watakabe et al. | |
| 7,271,229 B2 | 9/2007 | Okazoe et al. | |
| 7,429,428 B2 | 9/2008 | Watakabe | |
| 7,470,749 B2 | 12/2008 | Watakabe et al. | |
| 7,488,788 B2 | 2/2009 | Kasahara et al. | |
| 7,557,178 B2 | 7/2009 | Tayanagi et al. | |
| 2002/0144394 A1 | 10/2002 | Uchida et al. | |
| 2003/0198854 A1 | 10/2003 | Watakabe et al. | |
| 2006/0099476 A1 | 5/2006 | Watakabe et al. | |
| 2008/0138685 A1 | 6/2008 | Kaneko et al. | |
| 2009/0088539 A1 | 4/2009 | Kasahara et al. | |
| 2009/0215938 A1 | 8/2009 | Tayanagi et al. | |

FOREIGN PATENT DOCUMENTS

| | | |
|---|---|---|
| JP | 60-243292 | 12/1985 |
| JP | 63-14707 | 4/1988 |

OTHER PUBLICATIONS

G.K. Kostov, et al., Journal of Applied Polymer Science, vol. 47, pp. 735-741, "Study on the Synthesis of Perfluorovinyl-Sulfonic Functional Monomer and Its Copolymerization With Tetrafluoroethylene" (1993).

(Continued)

Primary Examiner — Tracy Dove
(74) Attorney, Agent, or Firm — Oblon, Spivak, McClelland, Maier & Neustadt, L.L.P.

(57) ABSTRACT

An electrolyte material for a polymer electrolyte fuel cell, which is made of a copolymer comprising repeating units based on $CF_2=CFCF_2OCF_2CF_2SO_3H$ and repeating units based on tetrafluoroethylene and which has an ion exchange capacity of from 0.9 to 1.5 (meq/g dry resin). This electrolyte material has ion conductivity and durability equal to conventional electrolyte material, is easy to synthesize, has a softening point higher than electrolyte material heretofore widely used for application to fuel cells and is suitable for operation of a polymer electrolyte fuel cell at a temperature higher than the conventional material.

13 Claims, 1 Drawing Sheet

OTHER PUBLICATIONS

Japanese Office Action issued Jan. 11, 2011, in Patent Application No. 2001-018979 (with English-language translation).

Zenichiro Takehara, "Fuel Cell Technology and Its Application", TECHNOSYSTEM, 1$^{st}$ Edition, Jan. 30, 2000, pp. 96-97 (with handwritten partial English translation).

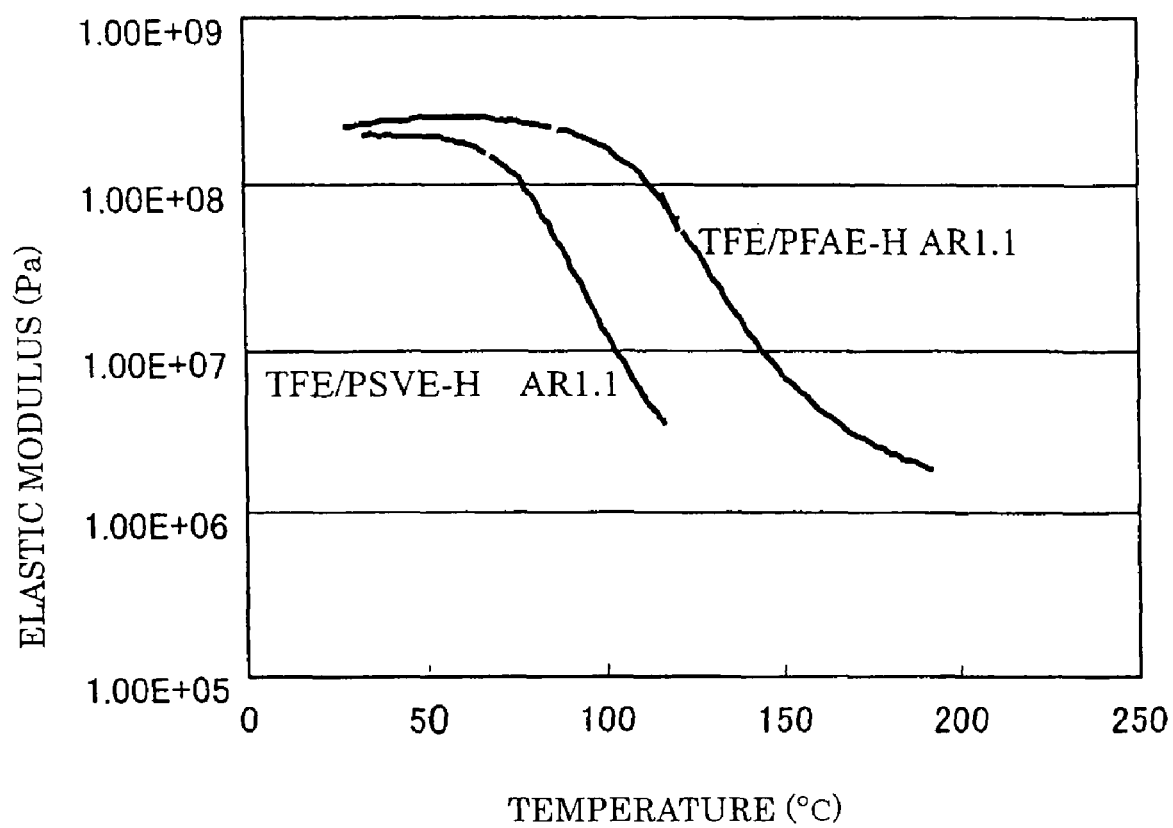

POLYMER ELECTROLYTE FUEL CELL, ELECTROLYTE MATERIAL THEREFORE AND METHOD FOR ITS PRODUCTION

This is a divisional application of U.S. application Ser. No. 10/640,022, filed Aug. 14, 2003.

TECHNICAL FIELD

The present invention relates to an electrolyte material for a polymer electrolyte fuel cell, and a polymer electrolyte fuel cell.

BACKGROUND ART

As an electrolyte material to be used as a polymer electrolyte membrane or a proton conductive polymer to be incorporated in a catalyst layer of an electrode constituting a polymer electrolyte fuel cell, it has been common to employ a polymer obtained by hydrolyzing a copolymer of tetrafluoroethylene (hereinafter referred to as "TFE") with a perfluorovinyl ether of the formula (A), followed by treatment for conversion to an acid-form to convert $-SO_2F$ groups to $-SO_3H$ groups. In the formula (A), Y is a fluorine atom or a trifluoromethyl group, m is an integer of from 0 to 3, n is an integer of from 1 to 12, and p is 0 or 1, provided that (m+p)>0.

$$CF_2=CF(OCF_2CFY)_mO_p(CF_2)_nSO_2F \qquad (A)$$

Among such polymers, particularly preferably employed is one obtained by converting a polymer obtainable by copolymerization of TFE with a monomer represented by the formula (B) to (D), to an acid form. In the formulae (B) to (D), q is an integer of from 1 to 8, r is an integer of from 1 to 8, and s is 2 or 3.

$$CF_2=CFO(CF_2)_qSO_2F \qquad (B)$$

$$CF_2=CFOCF_2CF(CF_3)O(CF_2)_rSO_2F \qquad (C)$$

$$CF_2=CF(OCF_2CF(CF_3))_sO(CF_2)_2SO_2F \qquad (D)$$

However, although the above-mentioned conventional copolymer was excellent in such properties as an ion conductivity to accomplish a high cell output power and durability to make a long term operation possible, it had a problem that the production cost was high, and it could not be produced at low costs. As a large factor for such a high production cost of the conventional copolymer, it may be mentioned that, for example, in the case of a $TFE/CF_2=CFOCF_2CF(CF_3)OCF_2CF_2SO_3H$ copolymer, it is produced by copolymerizing a vinyl ether monomer containing a $-SO_2F$ group synthesized by using, as an intermediate, expensive hexafluoropropylene oxide, with TFE.

Whereas, U.S. Pat. No. 4,273,729 discloses a copolymer of a monomer of the formula (2) (monomer (2)) synthesized without using hexafluoropropylene oxide, with TFE.

$$CF_2=CFCF_2OCF_2CF_2SO_2F \qquad (2)$$

However, the polymer synthesized for brine electrolysis in an Example (UTILITY EXAMPLE Q) of this patent publication, has an ion exchange capacity of 0.85 (meq/g dry resin) (equivalent weight: 1180), and thus, the ion exchange capacity is inadequate for a fuel cell, whereby it has a problem that the resistance is practically too high. Further, Journal of Applied Polymer Science, Vol. 47, 735-741 (1993) discloses a report on the results of a study of the synthesis of the monomer (2) and copolymerization of TFE with the monomer (2), wherein the relation between the charge composition comprising TFE and the monomer (2) and the obtainable polymer composition, is reported. However, also in this report, the highest ion exchange capacity among the obtained polymers is 0.77 (meq/g dry resin). And, it is stated that rather than the monomer (2), a conventional vinyl ether type monomer having a structure of $CF_2=CFO-$ is has a higher reactivity and is more advantageous for the copolymerization.

Namely, the monomer (2) has a lower copolymerization reactivity with TFE than the conventional vinyl ether type monomer, whereby a polymer having a high ion exchange capacity practically useful as an ion exchange membrane, has not heretofore been obtained. In the case of a copolymer using as starting materials a vinyl ether type monomer such as $CF_2=CFOCF_2CF_2SO_2F$ or $CF_2=CFOCF_2CF(CF_3)OCF_2CF_2SO_2F$, and TFE, it is possible to obtain a polymer having an ion exchange capacity of at least 1.1 (meq/g dry resin) easily by means of 2,2'-azobisisobutyronitrile (AIBN), which is hydrocarbon, as the initiator, as disclosed e.g. in Examples of JP-A-60-243292. However, in the case of the monomer (2), polymerization will not substantially proceed by the polymerization by means of AIBN, as disclosed in Comparative Reference Example in this specification.

DISCLOSURE OF THE INVENTION

The present invention has been made in view of the problems which the above-mentioned prior art has had, and it is an object of the present invention to provide an electrolyte material for a polymer electrolyte fuel cell which is easy to synthesize and which has an ion conductivity and durability equal to the above-mentioned conventional electrolyte materials, and to provide a polymer electrolyte fuel cell constituted by using such a material.

The present inventor has conducted an extensive research to accomplish the above object and as a result, has found it possible to obtain a polymer having a practically sufficient ion exchange capacity and a sufficient molecular weight and having a higher content of the monomer (2) than U.S. Pat. No. 4,273,729 or Journal of Applied Polymer Science, Vol. 47, 735-741 (1993), by improving the polymerization conditions. Further, it has been found that a TFE/monomer (2) copolymer prepared by adjusting the ion exchange capacity within a prescribed range, has sufficient ion conductivity and durability at the same time, and thus, the present invention has been accomplished.

The present invention provides an electrolyte material for a polymer electrolyte fuel cell, which is made of a copolymer comprising repeating units based on a monomer of the formula (1) and repeating units based on tetrafluoroethylene and which has an ion exchange capacity of from 0.9 to 1.5 (meq/g dry resin); and a polymer electrolyte fuel cell wherein a polymer electrolyte membrane made of the electrolyte material for a polymer electrolyte fuel cell and having a membrane thickness of from 5 to 70 μm, is disposed between an anode and a cathode.

$$CF_2=CFCF_2OCF_2CF_2SO_3H \qquad (1)$$

Further, the present invention provides a method for producing an electrolyte material for a polymer electrolyte fuel cell, which is made of a copolymer comprising repeating units based on a monomer of the formula (1) and repeating units based on tetrafluoroethylene and which has an ion exchange capacity of from 0.9 to 1.5 (meq/g dry resin), wherein an initiator of a perfluoro compound is used, and tetrafluoroethylene and a monomer of the formula (2) are subjected to radical copolymerization at from 60 to 100° C.:

$$CF_2=CFCF_2OCF_2CF_2SO_3H \quad (1)$$

$$CF_2=CFCF_2OCF_2CF_2SO_2F \quad (2)$$

Further, the present invention provides a method for producing an electrolyte material for a polymer electrolyte fuel cell, which is made of a copolymer comprising repeating units based on a monomer of the formula (1) and repeating units based on tetrafluoroethylene and which has an ion exchange capacity of from 0.9 to 1.5 (meq/g dry resin), wherein by means of a hydrocarbon type initiator, tetrafluoroethylene and a monomer of the formula (2) are subjected to radical copolymerization at a temperature of at least 20° C. and less than 50° C.

The present inventor has found it preferred ① to use an initiator having no hydrogen atom involved in chain transfer, preferably an initiator of a perfluoro compound and ② to carry out radical copolymerization at a relatively high temperature of about from 60 to 100° C., in order to obtain a TFE/monomer (2) copolymer having a practically sufficient molecular weight and having a high content of the monomer of the formula (2) (monomer (2)) having a low reactivity. It is preferred to adopt such conditions also in order to secure a practically sufficient polymerization rate.

If an initiator having no hydrogen involved in chain transfer is employed, the polymerization will be possible even at a low temperature of less than 60° C. In such a case, however, not only the reactivity of the monomer (2) tends to be low, but also the solubility of TFE in the monomer (2) or in the mixed liquid of the monomer (2) and the polymerization solvent, tends to increase due to the decrease of the polymerization temperature, whereby the polymerization pressure tends to be remarkably low. As the polymerization pressure lowers, the fluctuation of the ion exchange capacity of the obtainable polymer tends to be large as compared with the fluctuation of the polymerization pressure, whereby it tends to be difficult to obtain a polymer having the same ion exchange capacity in good reproducibility by controlling the pressure. In UTILITY EXAMPLE Q in U.S. Pat. No. 4,273,729, an initiator made of a perfluoro compound is used, but the polymerization is carried out at 40° C., since the decomposition temperature of the initiator is low. Therefore, the reactivity of the monomer (2) is low, and is in spite of the polymerization at a low pressure of 0.07 MPaG, a copolymer having a high content of the monomer (2) is not obtained.

In a case where a hydrocarbon type initiator is employed, if the polymerization temperature becomes high, the polymerization for the polymer tends to be substantially slow, or a problem that the molecular weight can not be increased, is likely to result. This is considered attributable to chain transfer to the initiator from the polymer growth terminal radicals. Accordingly, in a case where a hydrocarbon initiator is employed, it is obliged to carry out the polymerization at a relatively low polymerization temperature of less than 70° C., preferably less than 50° C. In such a case, the polymerization is possible, but the polymerization pressure tends to be low, whereby it tends to be difficult to control the ion exchange capacity, as compared with a case where the polymerization temperature is high, as mentioned above. In either case of the initiator having no hydrogen atom involved in chain transfer or the initiator of a hydrocarbon type, polymerization is required to be carried out at a temperature of at least 10° C., preferably at least 20° C., in order to secure the polymerization reactivity of the monomer (2).

The electrolyte material for a polymer electrolyte fuel cell of the present invention can be prepared without using hexafluoropropylene oxide as a raw material, whereby as compared with the above-mentioned conventional electrolyte material, the production cost can be substantially reduced. Further, the electrolyte material for a polymer electrolyte fuel cell of the present invention has excellent ion conductivity and durability equal to the conventional electrolyte material, since its ion exchange capacity (hereinafter referred to as $A_R$) is from 0.9 to 1.5 (meq/g dry resin) (hereinafter referred to simply as meq/g).

Here, if $A_R$ is less than 0.9, the ion conductivity tends to be inadequate. On the other hand, if $A_R$ exceeds 1.5, the water content tends to be so large that if a membrane is formed by using this electrolyte material, the membrane strength tends to be inadequate. From a similar view point, $A_R$ of this electrolyte material is preferably from 1.0 to 1.4 meq/g, particularly preferably from 1.1 to 1.3 meq/g.

In the present invention, the molecular weight of the polymer as the electrolyte material can be evaluated by a value of $T_Q$, an index of melt-flowability, as an index of the molecular weight of the polymer. $T_Q$ indicates the temperature, at which, when melt-extrusion of the resin is carried out using a nozzle having a length of 1 mm and an inner diameter of 1 mm under an extrusion pressure condition of 30 kg/cm², the extrusion rate would be 100 mm³/sec. In order to avoid the influence of the thermal decomposition of the polymer, the measurement is carried out at a temperature of not higher than 330° C. If $T_Q$ exceeds 330° C., the relation between the temperature and the extrusion rate at not higher than 330° C., is extrapolated on the high temperature side to obtain the temperature at which the extrusion rate would be 100 mm³/sec. $T_Q$ is measured and evaluated at a stage of the polymer having —$SO_2F$ groups before the hydrolysis and conversion to an acid form. $T_Q$ is a numerical value which will be an index of the molecular weight of the resin, and usually, the molecular weight is higher as $T_Q$ is higher. In order for the resin to have practically sufficient strength as a membrane, $T_Q$ is usually at least 150° C., preferably at least 180° C., more preferably at least 200° C.

Accordingly, the electrolyte material of the present invention is preferably obtained by hydrolysis and conversion to an acid form, of a TFE/monomer (2) copolymer having $T_Q$ within the above-mentioned range.

The upper limit of the preferred range of $T_Q$ depends on the fabricating method. In a case where melt processing is carried out, decomposition of —$SO_2F$ groups of the polymer begins in the vicinity of 350° C., whereby $T_Q$ is preferably at most 400° C., particularly preferably at most 350° C., further preferably at most 300° C. In a case where —$SO_2F$ groups are hydrolyzed and converted to —$SO_3M$ groups (wherein M is a monovalent cation, preferably H, an alkali metal or $NR^1R^2R^3R^4$ (wherein each of $R^1$ to $R^4$ which are independent of one another, is H or an alkyl group)), followed by dispersion or dissolution in an alcohol and/or water, and a liquid composition thereby obtained is used for fabrication such as casting, it is not necessary to set the upper limit for $T_Q$. However, with a view to securing the solubility/dispersibility in the solvent, $T_Q$ is preferably at most 400° C., more preferably at most 350° C.

Further, the polymer electrolyte fuel cell of the present invention is provided with at least a polymer electrolyte membrane made of the above-mentioned electrolyte material for a polymer electrolyte fuel cell and accordingly has output characteristics and cell life equal to the above-mentioned conventional polymer electrolyte fuel cell, and yet, the monomer production step can be shortened. Namely, for example, the compound of the formula (D) which has heretofore been used, is prepared from $FSO_2CF_2COF$ via two steps of hexafluoropropylene oxide addition and thermal decomposition. Whereas, the monomer (2) can be prepared by a single step reaction from $FSO_2CF_2COF$ as shown by scheme A which will be described hereinafter. Further, in the polymer electrolyte fuel cell of the present invention, the above-mentioned electrolyte material for a polymer electrolyte fuel cell of the present invention may be incorporated also in a catalyst layer of an anode and/or a cathode.

Here, if the membrane thickness of the polymer electrolyte membrane to be used for the polymer electrolyte fuel cell of the present invention is less than 5 μm, the strength of the membrane tends to be inadequate. On the other hand, if the membrane thickness exceeds 70 μm, the resistance of the electrolyte tends to be so large that no adequate cell output power tends to be obtainable. Further, from a similar viewpoint as described above, the membrane thickness of the polymer electrolyte membrane to be used for the polymer electrolyte fuel cell of the present invention is preferably from 10 to 50 μm.

BRIEF DESCRIPTION OF THE DRAWING

FIG. 1 shows the temperature dependency of the elastic modulus in one embodiment of the electrolyte material of the present invention and the temperature dependency of the elastic modulus of a conventional electrolyte material, as measured in Examples.

BEST MODE FOR CARRYING OUT THE INVENTION

Now, the electrolyte material for a polymer electrolyte fuel cell, and the polymer electrolyte fuel cell, of the present invention, will be described in further detail.

The electrolyte material for a polymer electrolyte fuel cell of the present invention can be obtained by copolymerizing the monomer (2) with TFE, and hydrolyzing the obtained copolymer and contacting it with an acid.

Further, the polymer electrolyte fuel cell of the present invention has an anode, a cathode and a polymer electrolyte membrane disposed between the anode and the cathode. And, the polymer electrolyte fuel cell of the present invention is not particularly limited with respect to the construction except that it is made of the electrolyte material for a polymer electrolyte fuel cell of the present invention and provided with a polymer electrolyte membrane having a membrane thickness of from 5 to 70 μm. For example, it may have a construction similar to the conventional polymer electrolyte fuel cell. Further, as mentioned above, the electrolyte material for a polymer electrolyte fuel cell may be incorporated also to a catalyst layer of the anode and/or the cathode, instead of the conventional perfluorosulfonic acid polymer. Further, the method for producing the polymer electrolyte fuel cell of the present invention is also not particularly limited, and the method for producing a polymer electrolyte membrane made of the electrolyte material for a polymer electrolyte fuel cell of the present invention, or the method for preparing the fuel cell from the electrodes and the polymer electrolyte membrane, is also not particularly limited, and a conventional method may be employed.

The monomer (2) to be used in the present invention can be prepared by a known synthetic reaction shown by the following scheme A as disclosed, for example, in U.S. Pat. No. 4,273,729. A similar synthetic method is disclosed also in Journal of Applied Polymer Science, Vol. 47, 735-741 (1993).

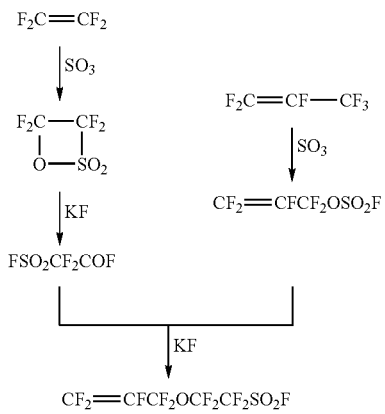

Scheme A

Further, the polymerization reaction of the monomer (2) with TFE is carried out under such a condition that radicals will be formed, for example, by a bulk polymerization method, a solution polymerization method, a suspension polymerization method or an emulsion polymerization method. Preferred is a bulk polymerization method or a solution polymerization method. Further, as a method to let radicals be formed, a method of irradiating a radiation such as ultraviolet rays, γ-rays or electron rays, or a method of adding a radial initiator, may, for example, be mentioned.

Further, in the present invention, with respect to the reaction temperature for the polymerization reaction of the above monomers, the polymerization is possible within a range of from 10 to 350° C. in a case where an initiator having no hydrogen atoms involved in chain transfer, preferably an initiator of a perfluoro compound, is used. If the reaction temperature for the polymerization reaction exceeds 350° C., the heat resistance of the resulting copolymer tends to be inadequate. From the viewpoint of the safety and easy control of the polymerization, it is preferably from 40 to 200° C., more preferably from 60 to 100° C. In a case where an initiator of a hydrocarbon type containing no fluorine atom, is used, the polymerization temperature is at least 10° C. and lower than 50° C., preferably at least 20° C. and lower than 50° C.

Further, in a case where the above-mentioned polymerization reaction of monomers is carried out by using a radical initiator in the present invention, the radical initiator may, for example, be a bis(fluoroacyl) peroxide, bis(chlorofluoroacyl) peroxide, a dialkyl peroxydicarbonate, a diacyl peroxide, a peroxyester, an azo compound, a persulfate, a perfluorocarbon having a tertiary carbon-tertiary carbon, tertiary carbon-quaternary carbon or quaternary carbon-quaternary carbon bond, or a perfluorocarbon compound having a N—F bond. From the viewpoint of increasing the molecular weight of the resulting copolymer, it is preferred to employ a fluorinated initiator among the above radical initiators, and it is more preferred to employ an initiator of a perfluoro compound.

As the initiator of a perfluoro compound, perfluorobenzyl peroxide, bis(perfluoropropionyl) peroxide, bis(perfluorobutyryl) peroxide, bis[(perfluorocyclohexyl)carbonyl]peroxide, bis(perfluoro-2-propoxypropanol) peroxide, bis(perfluoro-2,5-dimethyl-3,6-dioxanonanoyl) peroxide or perfluorodi-tert-butyl peroxide may, for example, be mentioned. As an initiator of a hydrocarbon type, diisopropyl peroxydicarbonate, isobutyryl peroxide, t-hexyl peroxypivalate or t-butyl peroxypivalate may, for example, be mentioned.

In the present invention, for the polymerization, a bulk polymerization method using no solvent, may be employed. However, in a case where the above-mentioned polymerization reaction of monomers is carried out by a solution polymerization method, the boiling point of the solvent to be used is usually from 20 to 350° C., preferably from 40 to 150° C., from the viewpoint of the handling efficiency. Further, the useful solvent is not particularly limited, the following may, for example, be mentioned.

1) A polyfluorotrialkylamine compound such as perfluorotributylamine or perfluorotripropylamine.

2) A fluoroalkane such as perfluorohexane, perfluorooctane, perfluorodecane, perfluorododecane, perfluoro(2,7-dimethyloctane), 2H,3H-perfluoropentane, 1H-perfluorohexane, 1H-perfluorooctane, 1H-perfluorodecane, 1H,4H-perfluorobutane, 1H,1H,1H,2H,2H-perfluorohexane, 1H,1H,1H,2H,2H,-perfluorooctane, 1H,1H,1H,2H,2H-perfluorodecane, 3H,4H-perfluoro(2-methylpentane) or 2H,3H-perfluoro(2-methylpentane).

3) A chlorofluoroalkane such as 3,3-dichloro-1,1,1,2,2-pentafluoropropane, 1,3-dichloro-1,1,2,2,3-pentafluoropropane or 1,1-dichloro-1-fluoroethane.

4) A polyfluorocycloalkane such as perfluorodecalin, perfluorocyclohexane, perfluoro(1,2-dimethylcyclohexane), perfluoro(1,3-dimethylcyclohexane), perfluoro(1,3,5-trimethylcyclohexane) or perfluorodimethylcyclobutane (regardless of structural isomers).

5) A polyfluorocyclic ether compound such as perfluoro(2-butyltetrahydrofuran).

6) A hydrofluoroether such as n-$C_3F_7OCH_3$, n-$C_3F_7OCH_2CF_3$, n-$C_3F_7OCHFCF_3$, n-$C_3F_7OC_2H_5$, n-$C_4F_9OCH_3$, iso-$C_4F_9OCH_3$, n-$C_4F_9OC_2H_5$, iso-$C_4F_9OC_2H_5$, n-$C_4F_9OCH_2CF_3$, n-$C_5F_{11}OCH_3$, n-$C_6F_{13}OCH_3$, n-$C_5F_{11}OC_2H_5$, $CF_3OCF(CF_3)CF_2OCH_3$, $CF_3OCHFCH_2OCH_3$, $CF_3OCHFCH_2OC_2H_5$ or n-$C_3F_7OCF_2CF(CF_3)OCHFCF_3$.

7) A fluorinated low molecular weight polyether.

Among the above solvents, it is preferred to select one having a small number of hydrogen atoms and having a low chain transfer property of the solvent. Further, the above solvents may be used alone or in combination as a mixture of two or more of them.

Further, in addition to the above solvents, a chlorofluorocarbon such as 1,1,2-trichloro-1,2,2-trifluoroethane, 1,1,1-trichloro-2,2,2-trifluoroethane, 1,1,1,3-tetrachloro-2,2,3,3-tetrafluoropropane or 1,1,3,4-tetrachloro-1,2,2,3,4,4-hexafluorobutane, may be technically used, but such is not preferred from the viewpoint of the global environment protection. Further, in the present invention, it is also possible to carry out the polymerization reaction by means of liquid or supercritical carbon dioxide.

Further, the copolymer of the monomer (2) with TFE may contain repeating units based on another fluorinated monomer as a small amount component. As such a fluorinated monomer, vinylidene fluoride, trifluoroethylene, vinyl fluoride, ethylene, chlorotrifluoroethylene, perfluoro(3-butenyl vinyl ether), perfluoro(allyl ether), perfluoro(2,2-dimethyl-1,3-dioxole), perfluoro(1,3-dioxole), 2,2,4-trifluoro-5-trifluoromethoxy-1,3-dioxole, perfluoro(2-methylene-4-methyl-1,3-dioxolane), 1,1'-[(difluoromethylene)bis(oxy)]bis[1,2,2-trifluoroethylene], hexafluoropropylene or a perfluorovinyl ether compound represented by $CF_2=CFOR^f$, may, for example, be mentioned. Here, $R^f$ is a $C_{1-8}$ perfluoroalkyl group, which may have a branched structure and which may contain an etheric oxygen atom.

Among copolymers thus obtained, a polymer having a perfluoro structure is particularly preferred from the viewpoint of the durability of the fuel cell.

The polymer may be treated with fluorine gas in order to stabilize the unstable moieties at the terminals. In the fluorination reaction in such a case, as the fluorine gas, it is preferred to employ fluorine gas diluted with an inert gas. The fluorination temperature is from 150 to 200° C., preferably from 170 to 190° C.

The copolymer prepared as described above, is, in the form of a powder or after being processed into a film by melt extrusion or hot press, subjected to hydrolysis treatment and then to treatment for conversion to an acid form. In the hydrolysis treatment, for example, in a solution of a base such as NaOH or KOH or in water or a mixture of water and an alcohol such as methanol or ethanol, or a polar solvent such as dimethylsulfoxide, —$SO_2F$ groups in the prepared copolymer are hydrolyzed and converted to —$SO_3Na$ groups or —$SO_3K$ groups. In the subsequent treatment for conversion to an acid-form, metal ions of e.g. —$SO_3Na$ groups or —$SO_3K$ groups in the copolymer are substituted by protons in an aqueous solution of an acid such as hydrochloric acid, nitric acid or sulfuric acid to an acid-form, whereby the functional groups are converted to sulfonic acid groups (—$SO_3H$ groups). The hydrolysis treatment and the treatment for conversion to an acid form are carried out usually at a temperature of from 0° C. to 120° C.

Here, in a case where the electrolyte material for a polymer electrolyte fuel cell of the present invention is to be used as a material for constituting a polymer electrolyte membrane to constitute a polymer electrolyte fuel cell, the copolymer prepared by the polymerization reaction may be formed into a film and then subjected to hydrolysis treatment and treatment for conversion to an acid-form, as described above, but it may be subjected to hydrolysis treatment and treatment for conversion to an acid form in the state of a powder, then dissolved in a solvent and formed into a film by a casting method. Further, in such a case, the polymer electrolyte membrane may be reinforced by e.g. a polytetrafluoroethylene (hereinafter referred to as PTFE) porous substrate or PTFE fiber (fibrils).

In a case where the electrolyte material for a polymer electrolyte fuel cell of the present invention is to be used as a resin to be incorporated to a catalyst layer of an electrode to constitute a polymer electrolyte fuel cell, the copolymer after converted to sulfonic groups by the above-mentioned treatment for conversion to an acid form, may be dissolved or dispersed in an organic solvent, a mixed solvent of an organic solvent and water, or water, so that it can be used in the form of a liquid composition.

The organic solvent is not particularly limited. However, the copolymer after converted to an acid form can be dissolved or well dispersed in an organic solvent having a —OH group, and it is preferred to use an organic solvent having a —OH group, and it is more preferred to use an organic solvent having an alcoholic-OH group. Specifically, methanol, ethanol, 1-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol may, for example, be mentioned. Further, as an organic solvent having a —OH group, an organic solvent having a carboxyl group such as acetic acid may also be used in addition to the above alcohols.

A catalyst layer of an anode and/or cathode of a polymer electrolyte fuel cell can be prepared by using the liquid composition obtained by dissolving or dispersing the copolymer after converted to an acid form, in water or in a solvent containing the above-mentioned organic solvent having a —OH group. For example, by using such a liquid composition, a cathode excellent in a gas diffusion property can be obtained. The concentration of the copolymer in such a liquid composition is preferably from 1 to 50%, more preferably from 3 to 30%, based on the total mass amount of the liquid composition. If this concentration is less than 1%, a large amount of an organic solvent will be required at the time of the preparation of an electrode. Further, if this concentration exceeds 50%, the viscosity of the liquid composition tends to be so high that the handling efficiency tends to deteriorate.

The polymer electrolyte fuel cell of the present invention can be prepared, for example, by either one of the following two methods by using a uniform dispersion obtained by mixing and dispersing electroconductive carbon black powder having fine platinum catalyst particles supported thereon in the above-mentioned liquid composition containing the copolymer. The first method is a method wherein the above-mentioned dispersion is coated and dried on both sides of a polymer electrolyte membrane, and then a carbon cloth or carbon paper to be a gas diffusion layer, is tightly bonded thereto. The second method is a method in which the above-mentioned dispersion is coated and dried on a carbon cloth or carbon paper to be a gas diffusion layer, and then an anode thus obtained is bonded on one side of the polymer electrolyte membrane and a cathode obtained by the same way is bonded to the other side. In such a manner, a so-called membrane electrode assembly having an anode disposed on one side and a cathode disposed on the other side of the polymer electrolyte membrane will be obtained. And, the obtained membrane electrode assembly is, for example, sandwiched between separators having grooves formed to constitute passages for a fuel gas or an oxidizing gas (air, oxygen or the like) containing oxygen and assembled into a cell to obtain a polymer electrolyte fuel cell of the present invention.

Further, the resin (hereinafter referred to as the electrode resin) to be incorporated to the electrodes of the polymer electrolyte fuel cell of the present invention may be composed solely of the solid polymer electrolyte material of the present invention, but may be a mixture of the solid polymer electrolyte material of the present invention with the above-mentioned conventional electrolyte material, or may be composed solely of the conventional electrolyte material.

Further, in the polymer electrolyte fuel cell of the present invention, the catalyst and the electrode resin contained in the cathode and/or the anode (hereinafter simply referred to as an electrode unless it is required is to particularly distinguish it) are preferably in a mass ratio of the catalyst:electrode resin=from 20:80 to 95:5, from the viewpoint of the electroconductivity and the water discharging property of the electrode. The mass of the catalyst here includes the mass of the carrier in the case of a supported catalyst which is supported on a carrier such as carbon.

The polymer electrolyte fuel cell of the present invention is useful not only for a hydrogen/oxygen type fuel cell but also for e.g. a direct methanol type fuel cell (DMFC). Methanol or an aqueous methanol solution to be used as a fuel for DMFC may be supplied by a liquid feed or a gas feed.

Now, the present invention will be described in further detail with reference to Examples and Comparative Examples. However, it should be understood that the present invention is by no means restricted thereto. Further, in Examples, the following abbreviations will be used.

PFAE: $CF_2=CFCF_2OCF_2CF_2SO_2F$,
PFAE-H: $CF_2=CFCF_2OCF_2CF_2SO_3H$
PSVE-H: $CF_2=CFOCF_2 CF(CF_3)OCF_2CF_2SO_3H$,
IPP: $(CH_3)_2CHOC(=O)OOC(=O)OCH(CH_3)_2$,
AIBN: $(CH_3)_2C(CN)N=NC(CH_3)_2(CN)$
HCFC 141 b: $CH_3CCl_2F$,
HCFC 225cb: $CCIF_2CF_2CHClF$,
PFB: $CF_3CF_2CF_2C(=O)OOC(=O)CF_2CF_2CF_3$,
PFBPO:

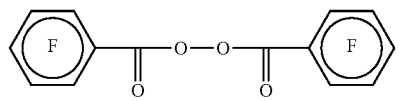

POLYMERIZATION EXAMPLE 1

Into a stainless steel autoclave having an internal capacity of 125 cm$^3$, 37.2 g of PFAE and, 205 mg of perfluorobenzyl peroxide (PFBPO) as an initiator, were introduced and cooled with liquid nitrogen and deaerated. Then, TFE was introduced into the autoclave, and the system was maintained at 80° C. under 0.345 MPaG (gauge pressure, the same applies hereinafter) for 2 hours and 50 minutes. The autoclave was cooled, and the gas in the system was purged to stop the polymerization. After diluting with HCFC 225cb, the polymer was flocculated by an addition of HCFC 141b, followed by filtration. Then, the polymer was stirred in HCFC 225cb and re-flocculated by HCFC 141b, followed by vacuum drying overnight at 80° C. $A_R$ of the polymer obtained by titration was 1.12 meq/g, and $T_Q$ measured by means of Capillary Rheometer CFT-500D (manufactured by Shimadzu Corporation) was 204° C.

POLYMERIZATION EXAMPLES 2 TO 5 AND POLYMERIZATION REFERENCE EXAMPLES 1 AND 2

TFE/PFAE copolymers of polymerization Examples 2 to 5 and Polymerization Reference Examples 1 and 2 were prepared in the similar operation as in Polymerization Example 1 by adjusting the polymerization conditions to the respective conditions as identified in Table 1 (the charged amount of PFAE, the species and amount of the initiator and its concentration to PFAE monomer, the polymerization temperature, the polymerization pressure and the reaction time). Further, the initiator used in Polymerization Example 4 was charged by using a solution having 3% of PFB dissolved in HCFC 225cb. With respect to the polymers of Polymerization Examples 2 to 5 and Polymerization Reference Examples 1 and 2 thus obtained, the yield, $A_R$ and $T_Q$ were measured, and the results are shown in Table 2 together with the results of Polymerization Example 1.

In a case where IPP or PFB was used as the initiator, the polymerization temperature had to be set low, since the decomposition temperature is low as compared with PFBPO, and it was necessary to substantially reduce the polymerization pressure in order to obtain a polymer having a proper ion exchange capacity. In such a system, the fluctuation of the ion exchange capacity of the resulting polymer tends to be large to the fluctuation of the polymerization pressure. In order to obtain a polymer having the same ion exchange capacity with good reproducibility, control is easy when the polymerization pressure is high. Accordingly, from the viewpoint of controlling the ion exchange capacity, it is preferred to carry out the polymerization by means of an initiator having a high decomposition temperature like PFBPO.

TABLE 1

|  | PFAE (g) | Initiator Species | Amount (mg) | Concentration (ppm) | Polymerization temperature (° C.) | Polymerization pressure (MPaG) | Reaction time (h) |
|---|---|---|---|---|---|---|---|
| Polymerization Example 1 | 37.2 | PFBPO | 205 | 5520 | 80 | 0.345 | 2.83 |
| Polymerization Example 2 | 74.4 | PFBPO | 74 | 995 | 80 | 0.33 | 5.08 |
| Polymerization Example 3 | 74.4 | PFBPO | 297 | 3990 | 80 | 0.31 | 2.25 |
| Polymerization Reference Example 1 | 74.4 | PFBPO | 74 | 1000 | 80 | 0.45 | 2.90 |
| Polymerization Example 4 | 63.7 | PFB | 45 | 700 | 30 | 0.02 | 9.50 |
| Polymerization Example 5 | 63.8 | IPP | 123 | 1920 | 40 | 0.05 | 9.00 |
| Polymerization Reference Example 2 | 63.8 | IPP | 130 | 2030 | 40 | 0.12 | 4.42 |

TABLE 2

|  | Yield (g) | $A_R$ (meq/g) | $T_Q$ (° C.) |
|---|---|---|---|
| Polymerization Example 1 | 7.3 | 1.12 | 204 |
| Polymerization Example 2 | 15.4 | 1.12 | 405 |
| Polymerization Example 3 | 9.6 | 1.18 | 227 |
| Polymerization Reference Example 1 | 22.8 | 0.84 | >>400 |
| Polymerization Example 4 | 2.3 | 1.07 | 271 |
| Polymerization Example 5 | 4.4 | 1.07 | 225 |
| Polymerization Reference Example 2 | 4.5 | 0.80 | 266 |

COMPARATIVE REFERENCE EXAMPLE

Into a stainless steel autoclave having an internal capacity of 125 cm³, 61.6 g of PFAE and 34 mg of AIBN were introduced and cooled with liquid nitrogen and deaerated. Then, TFE was introduced at 75° C. until the pressure became 0.30 MPaG, and stirring was continued for 3 hours, whereby no decrease in pressure was observed. Then, the temperature was raised to 80° C. The pressure rose to 0.32 MPaG. Stirring was continued in this state for 50 minutes, whereby no decrease in pressure was observed, and therefore, the autoclave was cooled, and the gas in the system was purged, whereupon the autoclave was opened, and 124 mg of AIBN was added. After cooling with liquid nitrogen and deaeration, tetrafluoroethylene was introduced again at 75° C. until the pressure became 0.30 MPaG. Stirring was continued for 1.5 hours, but no decrease in pressure was observed. Therefore, the temperature was raised again to 80° C. The pressure rose to 0.32 MPaG. Stirring was continued for 30 minutes, but no decrease in pressure was observed. Accordingly, the autoclave was cooled, and the gas in the system was purged to stop the reaction. A part of the liquid in the autoclave was sampled, and the monomers were distilled off under reduced pressure, whereby no substantial solid content remained. Thus, by the hydrocarbon type initiator, polymerization tends to hardly proceed when the polymerization temperature becomes high.

Measurement of Physical Properties

Using the TFE/PFAE copolymer of Polymerization Example 1, a film having a thickness of about 100 μm was prepared by hot press. It was hydrolyzed with a KOH aqueous solution containing dimethyl sulfoxide and then immersed in hydrochloric acid to convert it to an acid-form, followed by washing with deionized water. The obtained membrane was immersed in deionized water of 90° C., whereupon the water content was 40%. Further, with respect to the membrane, the AC resistivity was 6.0Ω·cm as measured by a four-terminal method employing a platinum wire at 80° C. under a relative humidity of 95%. As measured in the same manner, the water content of the TFE/PSVE-H copolymer having $A_R$ of 1.1 meq/g was 60% and the AC resistivity was 4.5Ω·cm.

With respect to the film of the TFE/PFAE copolymer converted to an acid-form, the temperature dependency of the elastic modulus was measured by means of a dynamic viscoelasticity measuring apparatus (manufactured by IT Keisoku Seigyo K.K.) at a measuring frequency of 1 Hz at a temperature-raising speed of from 2 to 3° C./min. The results of the measurement are shown in FIG. 1 together with the results of the measurement with respect to the TFE/PSVE-H film having $A_R$ of 1.1 meq/g. If the softening temperature where the elastic modulus starts to decrease is compared using the temperature where the elastic modulus becomes $1 \times 10^8$ Pa, it is evident that the TFE/PFAE-H copolymer has a softening temperature higher by at least 30° C. than the TFE/PSVE-H copolymer, and the TFE/PFAE-H copolymer is more suitable for operation at a high temperature than the TFE/PSVE-H copolymer.

Evaluation as a Polymer Electrolyte Fuel Cell

The TFE/PFAE copolymer having $A_R$ of 1.1 meq/g was hot pressed to obtain a film having a thickness of 50 μm. Then, this film was immersed in a solution of KOH/dimethylsulfoxide/water=15/30/55 (mass ratio) and subjected to hydrolysis at 90° C. Then, the film after the hydrolysis treatment was subjected to treatment for conversion to an acid-form by using 1 mol/L hydrochloric acid, followed by washing with water and drying.

Then, using an ethanol solution of a copolymer ($A_R$=1.1 meq/g) comprising repeating units based on PSVE-H and repeating units based on TFE, a platinum-supporting carbon is mixed to the solution so that the mass ratio of the copolymer to the platinum-supporting carbon (the amount of platinum supported=40 mass %) would be 3:7, to obtain a coating fluid. The coating fluid is coated on a carbon cloth to form a gas diffusion layer, to obtain a gas diffusion electrode having a catalyst layer with an amount of supported platinum of 0.4 mg/cm² formed on the gas diffusion layer.

Then, the above-mentioned film as a solid polymer electrolyte membrane is interposed between two sheets of the above-mentioned gas diffusion electrodes, followed by pressing by means of a flat plate press machine and further by hot pressing to obtain a membrane electrode assembly. On outside of this membrane electrode assembly, a titanium separator having a gas passage formed is disposed. Further, on outside thereof, a gas supply compartment made of PTFE, and further on outside thereof, a heater is disposed, whereby a polymer electrolyte fuel cell having an effective membrane area of 10 cm² is assembled.

While maintaining the temperature of the above polymer electrolyte fuel cell at 80° C., oxygen is supplied to the cathode and hydrogen is supplied to the anode, respectively, under atmospheric pressure while humidifying at 80° C., and an electric power is generated under such conditions. When the output power density is 0.3 A/cm², a voltage between terminals of about 0.67 V is obtained.

Then, as a Comparative Example, a polymer electrolyte fuel cell having the same construction as the above fuel cell except that as the solid polymer electrolyte membrane, Nafion 112 ($A_R$=0.91 meq/g) having a membrane thickness of about 50 μm is used, is prepared. An electric power is generated under the same conditions as the above fuel cell, whereby when the output power density is 0.3 A/cm², a voltage between terminals of about 0.66 V is obtained.

INDUSTRIAL APPLICABILITY

According to the present invention, an electrolyte material for a polymer electrolyte fuel cell which has ion conductivity and durability equal to a conventional electrolyte material and which can be produced at a low cost in a shorter process than ever, and a polymer electrolyte fuel cell constituted by using it, can be presented. Further, the electrolyte material of the present invention has a higher softening temperature than the polymer electrolyte material which is widely used in applications to fuel cells and is more suitable for operation at a high temperature than the conventional material.

What is claimed is:

1. A method for producing an electrolyte material for a polymer electrolyte fuel cell, which is made of a copolymer comprising repeating units obtained from a monomer of the formula (1) and repeating units obtained from tetrafluoroethylene and which has an ion exchange capacity of from 0.9 to 1.5 (meq/g dry resin), the method comprising subjecting tetrafluoroethylene and a monomer of the formula (2) in the presence of an initiator of a perfluoro compound to radical copolymerization at from 80 to 200° C. and then converting —SO₂F groups to —SO₃H groups:

$$CF_2=CFCF_2OCF_2CF_2SO_3H \quad (1)$$

$$CF_2=CFCF_2OCF_2CF_2SO_2F \quad (2).$$

2. The method for producing an electrolyte material for a polymer electrolyte fuel cell according to claim 1, wherein the initiator of a perfluoro compound is a perfluorobenzyl peroxide.

3. The method for producing an electrolyte material for a polymer electrolyte fuel cell according to claim 1, wherein the polymer obtained by the copolymerization of the monomer of the formula (2) and tetrafluoroethylene, has $T_Q$ of from 200 to 400° C. while $T_Q$ indicates a temperature at which, when melt-extrusion of the resin is carried out using a nozzle having a length of 1 mm and an inner diameter of 1 mm under an extrusion pressure condition of 30 kg/cm², the extrusion rate would be 100 mm³/sec., and is obtained by hydrolysis of said polymer followed by conversion to an acid-form.

4. The method for producing an electrolyte material for a polymer electrolyte fuel cell according to claim 1, wherein the ion exchange capacity is from 1.0 to 1.5 (meq/g dry resin).

5. The method for producing an electrolyte material for a polymer electrolyte fuel cell according to claim 1, wherein the ion exchange capacity of from 1.1 to 1.5 (meq/g dry resin).

6. The method for producing an electrolyte material for a polymer electrolyte fuel cell according to claim 3, wherein $T_Q$ is at most 350° C.

7. The method for producing an electrolyte material for a polymer electrolyte fuel cell according to claim 3, wherein $T_Q$ is at most 300° C.

8. The method for producing an electrolyte material for a polymer electrolyte fuel cell according to claim 1, wherein the copolymer additionally comprises a minor amount of repeating units obtained from another fluorinated monomer.

9. The method for producing an electrolyte material for a polymer electrolyte fuel cell according to claim 8, wherein copolymer has a perfluoro structure.

10. The method for producing an electrolyte material for a polymer electrolyte fuel cell according to claim 1, additionally comprising subjecting the copolymer to fluorination with fluorine gas alone or diluted with an inert gas prior to said converting.

11. The method for producing an electrolyte material for a polymer electrolyte fuel cell according to claim 10, wherein said subjecting is at a temperature of from 150 to 200° C.

12. The method for producing an electrolyte material for a polymer electrolyte fuel cell according to claim 11, wherein the temperature is from 170 to 190° C.

13. The method for producing an electrolyte material for a polymer electrolyte fuel cell according to claim 1, wherein the copolymerization temperature is from 80 to 100° C.

* * * * *